Figure 1:
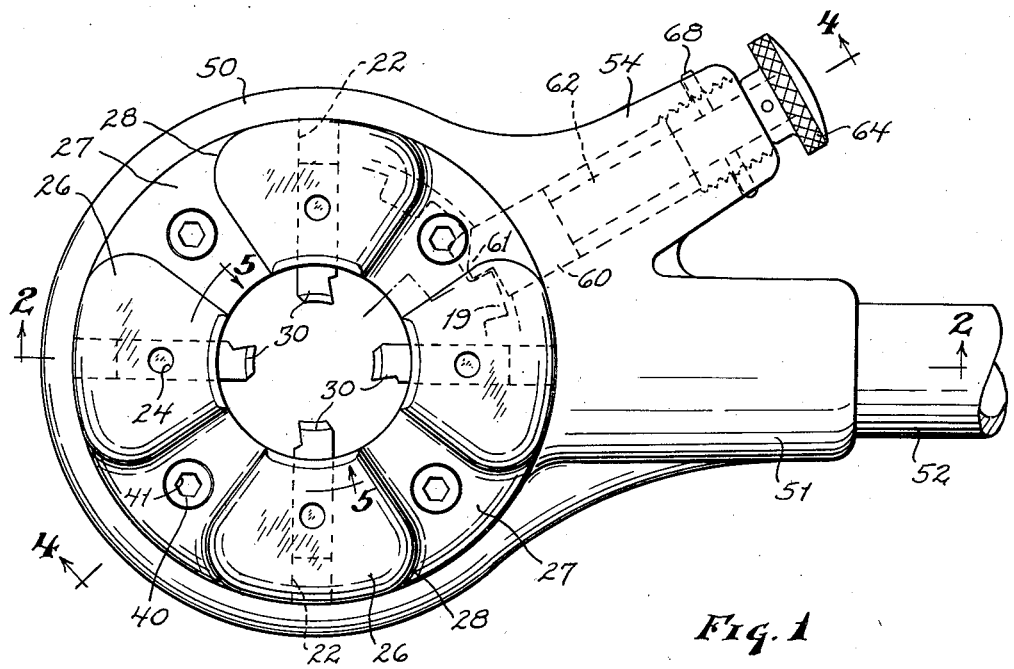

INVENTOR.
ROBERT B. PEALER

Jan. 6, 1942.  R. B. PEALER  2,269,221
DIE STOCK
Filed Aug. 8, 1941  2 Sheets-Sheet 2

INVENTOR.
ROBERT B. PEALER
BY Bates, Teare & McKean,
ATTORNEYS

Patented Jan. 6, 1942

2,269,221

UNITED STATES PATENT OFFICE 2,269,221

DIE STOCK

Robert B. Pealer, Garrettsville, Ohio, assignor to Beaver Pipe Tools Inc., Warren, Ohio, a corporation of Ohio Application August 8, 1941, Serial No. 405,931

10 Claims. (Cl. 10—124)

This invention relates to a die stock of that type wherein the chasers are fixedly mounted in radial notches in a suitable head which has a projecting barrel for a pipe guide and to receive the driving force. The driving member may comprise an embracing frame carrying a ratchet pawl which engages teeth formed on the barrel.

One of the objects of the invention is to provide a die stock of this form which shall carry the chasers in a very rigid manner, effectively bracing the same against the stresses to which they are subjected in use, and, at the same time will provide large spaces for chip clearance.

Another object is to simplify and cheapen the construction, enabling the die stock exclusive of the chasers and the driving frame to be made simply of two castings, with suitable screws for fastening them together.

The further object is to provide the die stock in such form that the same castings may be used for die stocks of different size, the castings being simply bored out for different diameters of pipe.

My invention is illustrated in the drawings hereof, and is hereinafter more fully described, and its essential novel characteristics are summarized in the claims.

Figure 2:
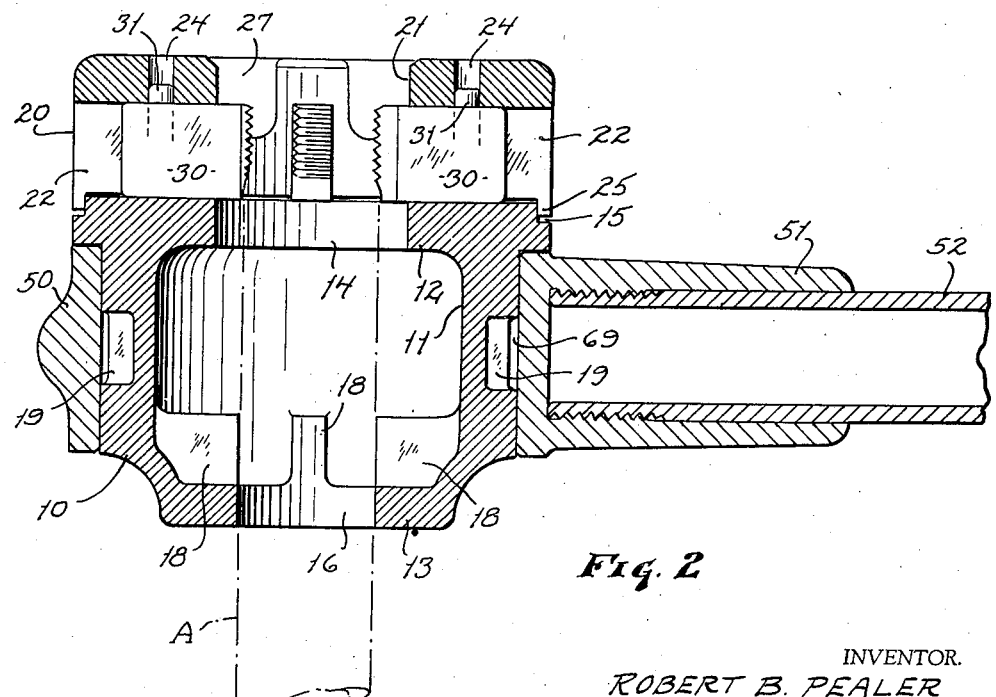
Figure 3:
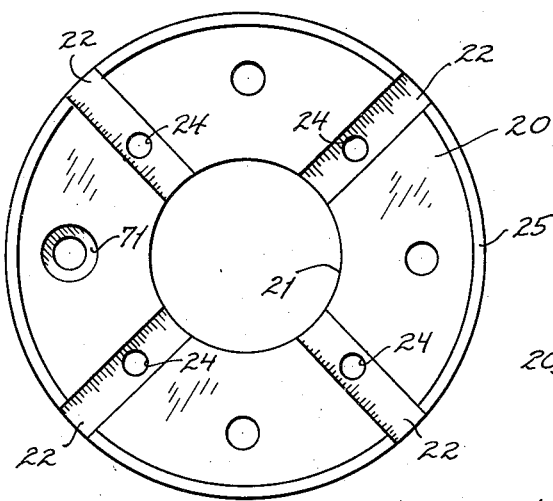
Figure 5:
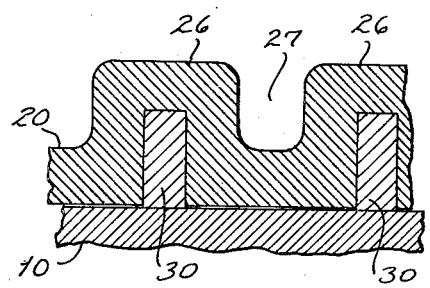
Figure 4:
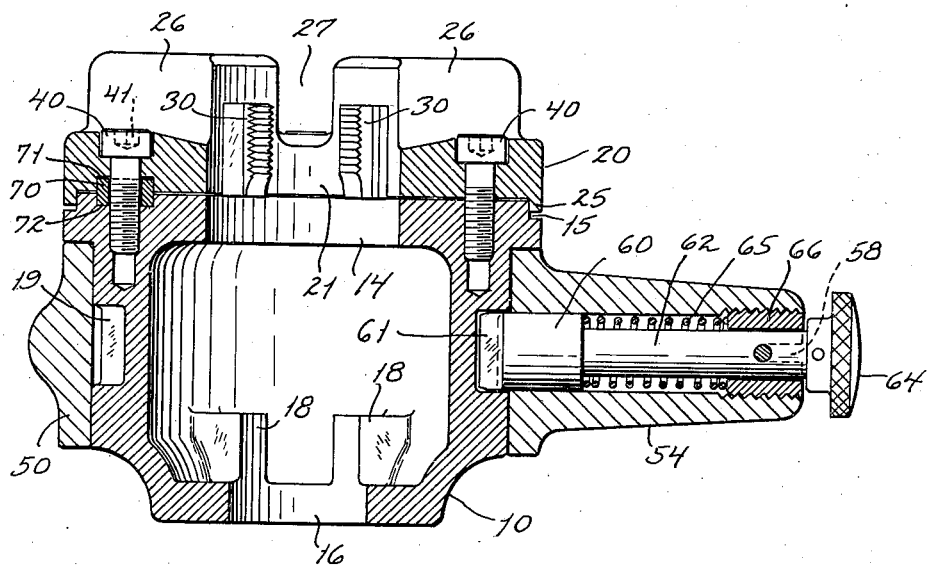

In the drawings, Figure 1 is a face view, or plan, of my die stock complete, except that the operating handle is broken away. Figure 2 is a sectional elevation of the die stock, the section plane being indicated by the line 2—2 on Figure 1. Figure 3 is a bottom plan of the cap member of the die stock, which carries the chasers. Figure 4 is an axial section of the die stock, the plane of the section being indicated by the slightly off-set line 4—4 on Figure 1. Figure 5 is a fragmentary cross-section of the cap member, as indicated by the line 5—5 on Figure 1.

The two members of the die stock frame are designated 10 and 20, respectively. The member 10 is a hollow barrel having a large internal cavity 11, and a top or plate-like portion 12, a bottom plate-like portion 13, each over-hanging the cavity. The top portion 12, has a comparatively large circular opening 14 through it, while at the outer edge it has a rabbet 15. The bottom plate-like portion 13 has an opening 16, which is of a diameter selected according to the size of the pipe to be threaded, such pipe being indicated by the broken lines A in Figure 2. In the interior of the member 10 are radial lugs 18, the inner face of which align with the periphery of the opening 16. On the exterior of the barrel 10 is shown an annular row of teeth 19, adapted to be engaged by a ratchet driving pawl, as hereinafter explained.

The cap member 20 of the die stock comprises a single casting having a central opening 21 of about the same diameter as the opening 14 of the body, and having radial notches 22 extending through it and open at the bottom of the member, for the reception of the chasers 30. Above each notch 22 in the cap member is a cylindrical hole 24 adapted to receive a pin 31, rising from the chaser. Cap member 20 has an annular flange 25 at its lower edge, adapted to seat in the rabbet 15 of the barrel 10.

The cap member, while it has a flat bottom, and comes to a flat top, as illustrated in Figures 2 and 4, is formed with alternate bosses 26, and recesses 27, as shown in Figures 1 and 5. The bosses have their walls extending in a substantially radial direction from the inner edge outwardly, and then curving as at 28, in Figure 1, to merge with the outer wall of the boss, which is a cylindrical arc. The recesses 27 constitute effective clearance openings, and, as will be seen from Figure 1, flare outwardly from the region adjacent the cutting teeth.

The cap member is held to the barrel by screws 40 extending through the bottom wall of the cap, and threaded into the barrel member 10, as shown in Figure 4. These cap screws may be formed with angular recess 41 in their heads to enable them to be turned by a correspondingly shaped wrench bar.

The die stock shown is of the ratchet type, and in that case is provided with the teeth 19 heretofore mentioned. In this case the driving member of the die stock comprises an annular frame 50 embracing the barrel, and having a radial sleeve 51 internally threaded to receive an operating handle 52. At one side of the sleeve 51 is another radial sleeve 54, in which is mounted a slidable pawl-block 60, having a tooth 61 on half its area, which is adapted to co-act with the teeth 19. The tooth 61 has one abrupt face on the diameter of the pawl, and an inclined end, as shown by dotted lines in Figure 1. The pawl-block has an outwardly extending shank 62 on the outer end of which is a knob 64. A compression spring 65 surrounds the shank and is compressed between the pawl-block and a plug 66, screwing into the sleeve 54. The pawl shank is provided with a transverse pin 68, the projecting portions of which normally occupy notches 58 in the sleeve.

Figure 1 indicates the position of the pawl for driving the barrel by movement of the ratchet frame in a clockwise direction, the backward movement of the frame causing the pawl, by reason of its inclined end, to click idly over the teeth 19. To drive the barrel in the opposite direction, knob 64 is drawn out and given a half rotation, which causes the pawl to face in the opposite direction, so that counter-clockwise movement of the frame will move the body in the counter-clockwise direction, while the reverse movement is idle.

If the knob 64 is drawn out and given a quarter turn, the pin 68 will rest on the end of the sleeve 54, and thus hold the pawl in idle position. In this position the pawl tooth is entirely free from the body teeth 19, but it may, if desired, extend into the annular body-recess 69, Figure 2, beyond the teeth, and thus prevent separation of the ratchet frame from the barrel. A slight outward pull on the knob 64 in this position withdraws the tooth 61 entirely from the recess 69, enabling the ratchet frame to be taken off of the barrel.

To relieve the screws 40 of the driving stresses in the operation of the die stock, I provide a thrust block seated snugly in recesses in the meeting faces of the barrel and cap. This block is preferably in the form of a circular washer 70 surrounding one of the pins 40 and seating in a circular cavity 71 in the cap and the corresponding cavity 72 in the barrel.

As originally formed, the pipe opening 16, and the inner face of the lugs 18, define an opening corresponding to that of the smallest pipe with which the die stock is to be used. When the die stock is to be made for a larger pipe, the opening 16, and the cylindrical space defined by the lugs 18 are bored out to the larger size desired. If the new size is considerably larger than the cast size, the opening 14 at the top of the barrel, and the opening 21 at the top of the cap are also bored out. After the proper borings have been made I mount chasers suitable for such larger size. The pins on the different sized chasers are so located thereon that when they occupy the openings 24, they would hold the chasers in proper cutting position.

It will be seen that my die stock is extremely simple, consisting merely of the two castings 10 and 20, and the screws 40 for holding them together. The cap member is properly positioned on the barrel by the cap flange occupying the barrel rabbet. The chaser notches 22 are adapted for chasers for cutting different sizes of pipe, and to properly locate such chasers, it is only necessary that their pins 31 be so positioned thereon that the cutting teeth of opposed chasers be properly spaced for that size of pipe.

I claim:

1. In a die stock, the combination of a hollow barrel having a flat end, a cap formed with alternate downwardly and upwardly open notches, the downward notches being parallel-sided, screws extending through the cap at the base of the upwardly open notches to hold the cap on the barrel, chasers occupying the downwardly open notches, inter-engaging projections and recesses on the chasers and cap to locate the chasers, and means for rotating the barrel.

2. In a die stock, the combination of a hollow barrel having a flat top with an opening through it, and having an opening at its bottom and having interior lugs forming a pipe guide, said barrel having an annular row of teeth on its cylindrical wall, a driving frame loosely embracing the barrel, and having a spring-pressed ratchet pawl to engage said teeth in either direction according to the position of the pawl, and a cap member formed with downwardly open parallel-sided radial notches, and with upwardly open, outwardly flaring notches between the radial notches, the cap member having a downward peripheral flange adapted to embrace the upper edge of the barrel, and chasers occupying the radial notches and resting on the flat top of the barrel and having projecting pins engaging holes in the top of the cap member.

3. A die stock having a two-piece frame composed of a hollow barrel and a cap member with alternately arranged chaser notches facing the barrel and clearance notches facing in the opposite direction, the cap member engaging the end of the barrel, and secured thereto by screws extending through the cap member at the base of the clearance notches, and chasers in the chaser-notches resting on the end of the barrel, the cap member and the chasers having inter-engaging recesses and projections to the position of the chasers.

4. A die stock comprising a hollow barrel having a top portion with a central opening, a cap member abutting the end of the barrel, and secured thereto, said cap member having radial notches, chasers therein resting on the end of the barrel, and a thrust block snugly seating in registering recesses in the meeting faces of the barrel and cap.

5. A die stock frame comprising a hollow barrel having inwardly projecting plate-like portions at its top and bottom and having inwardly extending lugs on the interior, the face of the lugs forming a pipe guide, and the hollow of the barrel being materially larger than said guide, enabling the guide to be subsequently bored out for a larger pipe, and a cap member abutting the end of the barrel and formed with alternating inwardly and outwardly facing notches, the inwardly facing notches being parallel-sided, and closed at their inner edges by the end of the barrel, and the outwardly facing notches providing chip clearance.

6. A die stock comprising a hollow barrel having top and bottom pipe openings and teeth on the exterior of the barrel, the top end of the barrel being flat, and a cap resting on the flat end of the barrel and bolted thereto, said cap having upwardly facing clearance notches open at the end of the die stock and also open inwardly and outwardly, said cap having also downwardly facing radial notches which are adapted to receive chasers bearing at their lower edges on the barrel and at their sides and upper edges against the cap, pins on the chasers occupying openings in the cap to position the chasers, and a driving member surrounding the barrel and coacting with said teeth.

7. A die stock comprising a hollow barrel, a cap member abutting the end of the barrel and secured thereto and having alternately arranged chaser notches facing the barrel and clearance notches facing in the opposite direction and extending radially and longitudinally through the end and outer periphery of the barrel, and chasers in the chaser-notches resting against the end of the barrel.

8. A die stock comprising a hollow barrel having a plate-like top portion with a central opening, a cap member abutting the end of the barrel and secured thereto, said cap member having radial notches to receive chasers and having clearance notches alternating with the chaser notches, said clearance notches being open radially and longitudinally from the end of the barrel, the top portion of the cap member above the chasers and the chasers having inter-engaging recesses and projections to position the chasers.

9. In a die stock, the combination of a hollow barrel, a cap member adapted to abut the end of the barrel and formed with alternating inwardly and outwardly facing open notches, the outwardly facing notches being open radially as well as longitudinally outward from the barrel member for the purpose of effecting clearance of chips, the inwardly facing notches being parallel-sided, screws extending through the cap member at the base of the outwardly facing notches into the barrel for holding the cap member on the barrel, the inwardly facing notches being closed by the end of the barrel, chasers in the inwardly facing notches resting at their lower edges on the end of the barrel and having pins at their upper edges occupying recesses in the cap member above the chaser notches.

10. In a die stock, the combination of a hollow barrel having inwardly projecting plate-like portions at its top and bottom with openings in axial alignment, the body of the barrel having inwardly extending lugs on the interior, the face of the lugs forming a pipe guide, a cap member secured to the end of the barrel and having inwardly and outwardly facing notches arranged alternately, the outwardly facing notches being open radially as well as longitudinally outward from the barrel member for the purpose of effecting clearance of chips, and chasers in the inwardly facing notches.

ROBERT B. PEALER.